US007574450B2

(12) United States Patent
Plouffe, Jr.

(10) Patent No.: US 7,574,450 B2
(45) Date of Patent: Aug. 11, 2009

(54) METHOD FOR SHARING AN OBJECT BETWEEN APPLICATIONS

(75) Inventor: Wilfred E. Plouffe, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 11/110,151

(22) Filed: Apr. 19, 2005

(65) Prior Publication Data
US 2006/0235876 A1 Oct. 19, 2006

(51) Int. Cl.
G06F 17/30 (2006.01)
(52) U.S. Cl. .............................. 707/103 R; 707/103 Y; 707/103 X; 707/103 Z
(58) Field of Classification Search ............. 707/103 R, 707/103 Y, 103 X, 103 Z
See application file for complete search history.

(56) References Cited

U.S. PATENT DOCUMENTS

| 5,873,097 | A | 2/1999 | Harris et al. .................. 707/13 |
| 6,405,360 | B1 | 6/2002 | Bohrer et al. .................. 717/1 |
| 6,810,522 | B2 * | 10/2004 | Cook et al. .................. 719/316 |
| 7,216,352 | B2 * | 5/2007 | Czajkowski et al. ......... 719/332 |
| 7,424,721 | B2 * | 9/2008 | Jairath ......................... 719/330 |
| 2002/0194152 | A1 | 12/2002 | Treil et al. ..................... 707/1 |
| 2005/0005018 | A1 * | 1/2005 | Datta ........................ 709/229 |
| 2005/0028168 | A1 * | 2/2005 | Marcjan ..................... 719/315 |
| 2005/0086237 | A1 * | 4/2005 | Monnie et al. ............. 707/100 |
| 2005/0086656 | A1 * | 4/2005 | Whitlock et al. ............... 718/1 |
| 2005/0086670 | A1 * | 4/2005 | Christensen et al. ........ 719/330 |

* cited by examiner

Primary Examiner—Don Wong
Assistant Examiner—Hanh B Thai
(74) Attorney, Agent, or Firm—Samuel A. Kassatly; Shimokaji & Associates, P.C.

(57) ABSTRACT

An object sharing system instantiates or defines an object container that can be cloned and return a reference to a "saved" object, allowing an object to be passed between applications while maintaining a consistent reference to the object. The object sharing system places a reference to an object in the object container. A serialization module serializes the object container; the serialized object container is passed to a second application comprising the object sharing system. A deserialization module in the second application deserializes the object container, instantiating an object container clone and extracting a reference clone. The reference clone allows the second application to manipulate the saved object as desired without further interaction with the first application.

5 Claims, 3 Drawing Sheets

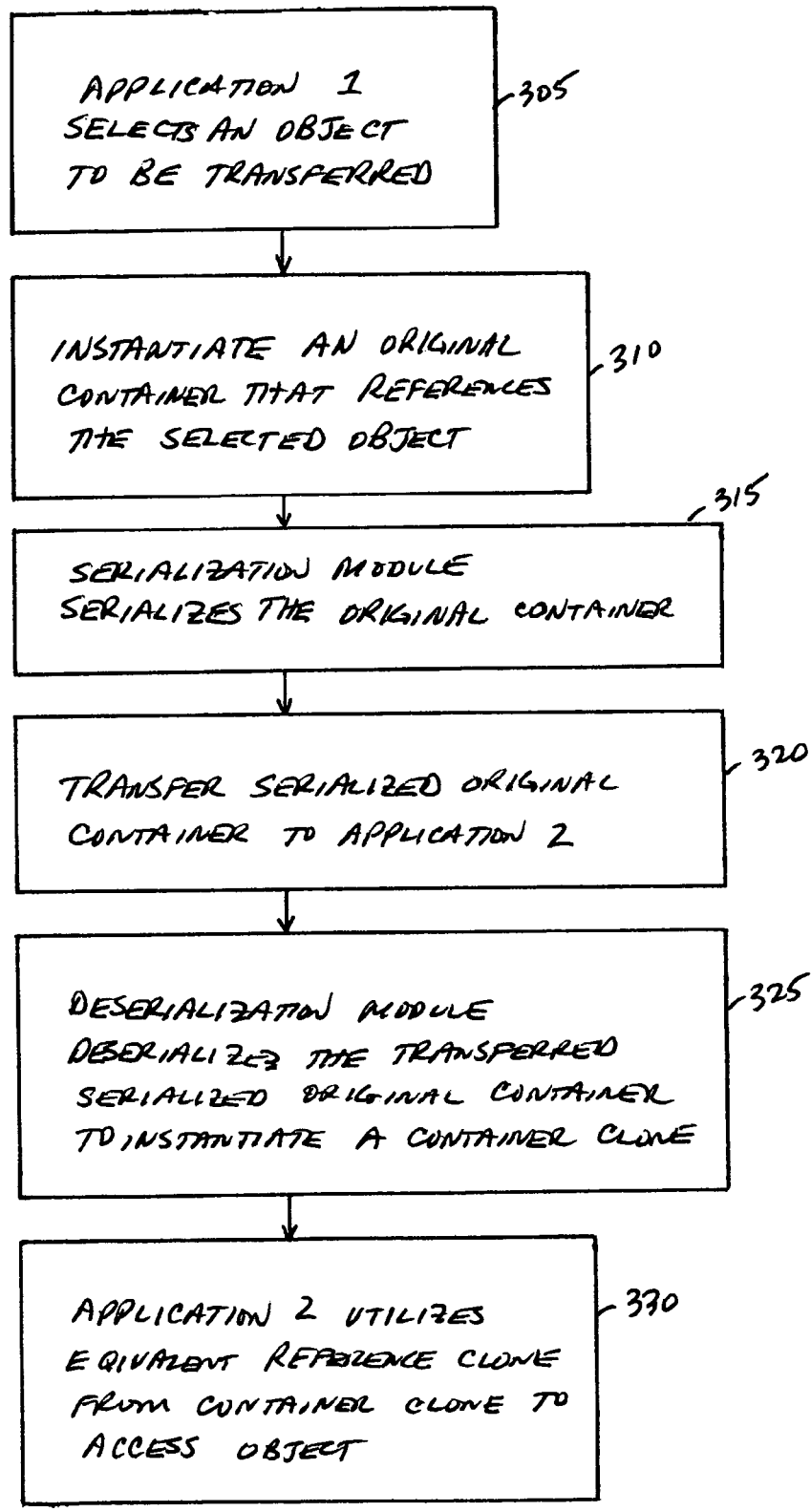

METHOD FOR SHARING AN OBJECT BETWEEN APPLICATIONS

CROSS-REFERENCE TO RELATED APPLICATION

The present application is related to co-pending U.S. Patent Application titled "A Tamper-Resistant Trusted Java Virtual Machine and Method of Using the Same", Ser. No. 10/723,725, which was filed on Nov. 26, 2003, which is assigned to the same assignee as the present application, and which is incorporated herein by reference.

FIELD OF THE INVENTION

The present invention generally relates to applications sharing objects while operating on a single processor or distributed network of processors. More specifically, the present invention pertains to a method for passing between applications an object that cannot be serialized while still maintaining a consistent reference to the object.

BACKGROUND OF THE INVENTION

The entertainment industry is in the midst of a digital revolution. Music, television, and movies are increasingly becoming digital, offering new advantages to the consumer in quality and flexibility. At the same time, since digital data can be perfectly and quickly copied, the digital revolution also comprises a threat. If consumers may freely copy entertainment content and offer that content on the Internet, the market for entertainment content may evaporate.

Content protection schemes have been devised to lessen the threat, such as Digital Rights Management (DRM) systems, Content Scrambling System (CSS) for DVD video, and Content Protection for Prerecorded Media (CPPM) for DVD audio, among many others. These systems share the following feature: the software that implements them is required to be "robust," that is the software resists attacks by hackers, either to extract the secrets (keys) from the software or to modify the behavior of the software to get unauthorized functionality. Technologies that resist such attacks are called tamper-resistant software. Other application areas, such as finance or automotive control, may have robustness requirements. They may also have requirements to tie data to a particular processor. Such applications often employ tamper-resistant software technologies.

A common perception is that tamper-resistant software conflicts with the concept of "open source" on the premise that a hacker may more easily compromise an open source program. However, an open source content protection scheme presents definite advantages. Open standards may prevent fragmentation of the market and forestall proprietary solutions from locking out competition. In addition, an open source content protection scheme may actually help reduce the level of hacker attacks. The well-known break to the DVD video CSS scheme was enabled, in no small part, by leaks from insiders. These insiders were apparently motivated by the desire to have a DVD player on the open-source platform Linux.

Meanwhile, the Java™ language has replaced the computer language C for many applications. The Java language is implemented by converting a source program to instructions (called byte codes) of a hypothetical computer referred to as the Java Virtual Machine, or Java virtual machine (JVM™).

The Java virtual machine is not an actual hardware computer, instead it is a program that interprets the byte codes, and implements their functions on a given physical computer. This approach has given Java portability; the language is available in all types of computers and even in embedded devices such as cell phones, stereos, and TV set-top boxes.

Several companies have produced computers whose instruction set is the same as the Java virtual machine. In such a case, the Java virtual machine is real, not virtual. However, by convention, such a real computer is still called a "Java virtual machine", a practice followed in the description of the present invention.

One approach to content protection uses a Java virtual machine to implement the robustness requirements of content protection schemes. In this approach, all secret data and algorithms are not implemented in Java; instead, they are "wired in" to the Java virtual machine itself. Furthermore, the Java virtual machine provides a "sand box" environment so that unauthorized actions are prevented. For example, when the Java virtual machine is dealing with protected content, the normal file-writing mechanism of Java is disabled. Advantageously, there is no need to verify the integrity of the Java code itself.

A trusted Java virtual machine uses a trusted dictionary to pass objects from one trusted application to another. The first trusted application places a value into the trusted dictionary; a "put" implementation of the trusted dictionary then serializes the object to a byte array and encrypts the byte array. A second trusted application obtains the value from the trusted dictionary; a "get" implementation then decrypts the byte array and deserializes the value to instantiate a clone of the original object. The clone of the original object is returned to the caller. In a similar manner, passing objects is required when performing inter-process communication (IPC) either within a single processor or between processors.

However, the first trusted application and the second trusted application may need to share the same object. In some cases, passing a clone of the object may not be acceptable. In other cases, the first trusted application and the second trusted application need to share an object that cannot be serialized. For example, objects that comprise a date, open file systems, complex state variables such as graphs, convoluted memory structure, a queue, a stack, or a stream, etc, cannot be serialized.

One conventional approach to passing an object between a first application and a second application is to send a proxy of an object. This approach is used by common object request broker architecture (CORPA), a standard for communicating between distributed objects. However, whenever the second application wishes to manipulate the object, the second application has to interact with the first application, requiring a descriptive overhead that consumes computational resources and bandwidth.

Another conventional approach addresses passing an object by means of a "handshake" between a first application and a second application. The first application and the second application agree in advance on how the second application finds the desired object. However, this approach requires the first application to give access and information to the second application that may compromise a trusted environment or other security features of the first application.

What is therefore needed is a system, a computer program product, and an associated method for sharing an object between applications that does not require serialization of the object. The need for such a solution has heretofore remained unsatisfied.

SUMMARY OF THE INVENTION

The present invention satisfies this need, and presents a system, a computer program product, and an associated method (collectively referred to herein as "the system" or "the present system") for sharing an object between applications. The present system instantiates or defines an object container that can be cloned and return a reference to an object saved in storage. The present system allows for passing an object between applications while maintaining a consistent reference to the object. While the present system is described in terms of a virtual machine, the present system can be used in any processing environment. Moreover, while the present system is described in terms of Java, the present system can be used with any processing language.

The present system comprises a serialization module and a deserialization module implemented in an application. The present system places a reference to an object in the object container. The serialization module serializes the object container, instantiating a serialized object container. The serialized object container is passed to a second application comprising the present system. The deserialization module in the second application deserializes the object container, instantiating an object container clone. The present system in the second application extracts the reference clone to the saved object. The reference clone allows the second application to access or manipulate the saved object as desired without further interaction with the first application. The object container saves a reference to the saved object such that any object container clone is able to return to the second application the original object.

In one embodiment, the serialization module encrypts the serialized object container to instantiate an encrypted serialized object container. When passed to the second application, the deserialization module decrypts the encrypted serialized object container to obtain the serialized object container clone.

In a further embodiment, the present system is applied to all objects passed from one an application to another. In yet another embodiment, the present system determines which objects cannot be serialized. The present system is applied to those objects that cannot be serialized.

The present system can be used, for example, in a trusted Java virtual machine. Trusted applications of the trusted Java virtual machine can use authentication mechanisms associated with a trusted dictionary, yet pass objects to be shared without understanding or implementing more complex algorithms. A user interface remains simple to explain and to use. A single implementation of the trusted dictionary is used, further simplifying use and explanations of use of the trusted Java virtual machine. Furthermore, the present system can pass objects such as a Queue or a Java stream that are manipulated by more than one application; i.e., more than one trusted application. Each trusted application with access to the Queue or the Java stream can insert and remove items from the Queue or the Java stream. In a further embodiment, the trusted application may be represented by a Trusted Bundle as described in copending patent application Ser. No. 10/723, 725, supra.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

FIG. 3 is a process flow chart illustrating a method of operation of the object sharing system of FIG. 1.

DETAILED DESCRIPTION OF PREFERRED EMBODIMENTS

The following definitions and explanations provide background information pertaining to the technical field of the present invention, and are intended to facilitate the understanding of the present invention without limiting its scope:

Object: any item that can be uniquely referenced by an identifier such as, for example, an address, an object pointer, a unique ID, etc.

Serialize: to represent an object as a series of bytes.

Deserialize: to convert a series of bytes to an object.

Figure 1:
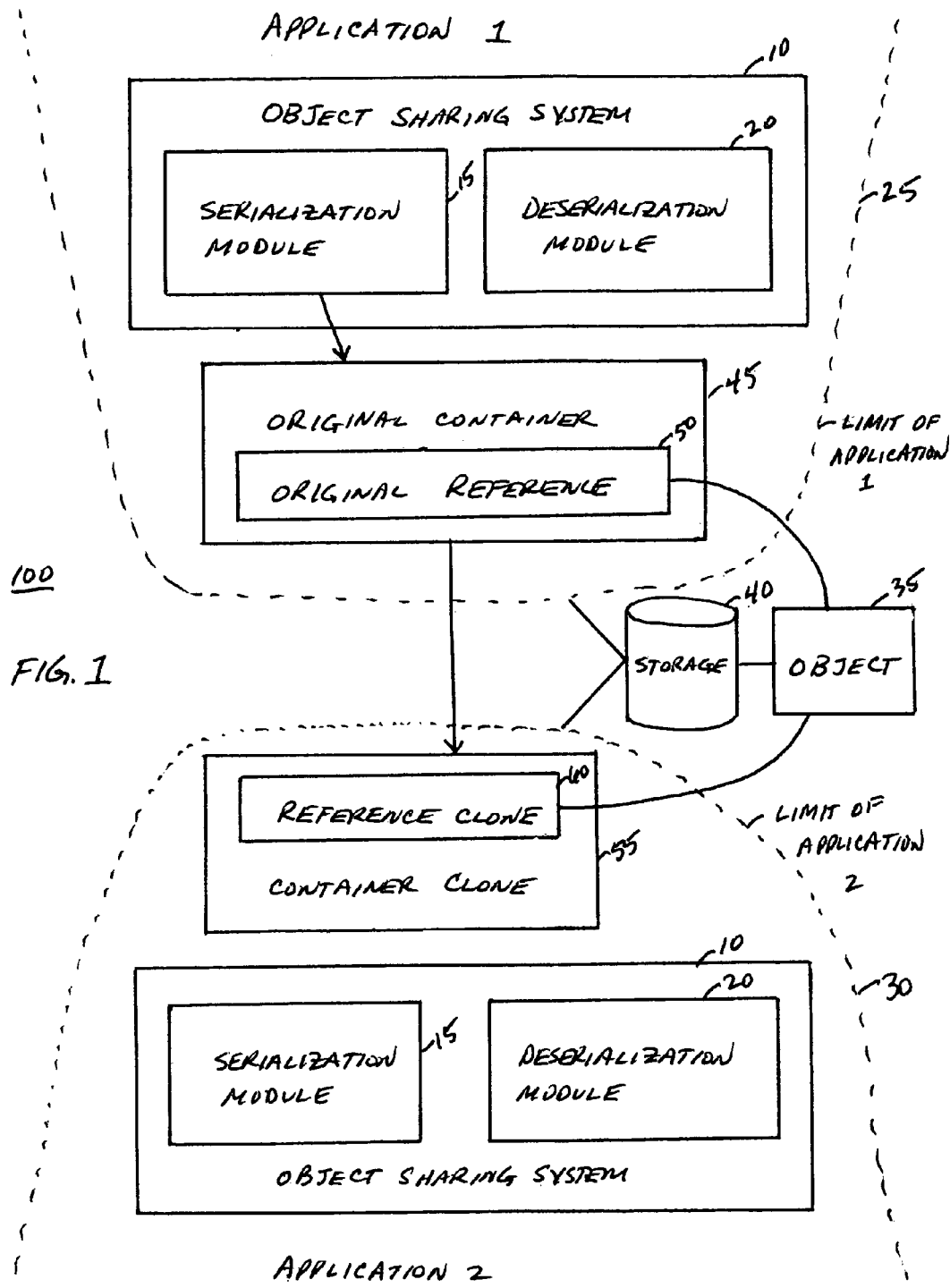
FIG. 1 is a schematic illustration of an exemplary operating environment in which an object sharing system of the present invention can be used.

FIG. 1 portrays an exemplary overall environment, processor 100, in which a system and associated method for sharing an object between applications (the object sharing system 10 or the "system 10") according to the present invention may be used. System 10 comprises a software programming code or a computer program product that is typically embedded within, or installed on a processor such as processor 100. Alternatively, system 10 can be saved on a suitable storage medium such as a diskette, a CD, a hard drive, or like devices.

System 10 comprises a serialization module 15 and a deserialization module 20. Application 1, 25, comprises system 10. Additional applications such as application 2, 30, comprise system 10. In the exemplary configuration represented by FIG. 1, application 1, 25, and application 2, 30, reside on processor 100.

Application 1, 25, provides access to an object 35 by application 2, 30, through the use of system 10. Object 35 resides on storage 40. Storage 40 comprises, for example, memory, a disk storage, a diskette, a CD, a hard drive, or like devices. System 10 instantiates an original container 45 and places an original reference 50 in the original container 45. The original reference 50 references object 35. The original reference 50 comprises reference information such as, for example, an address, an object pointer, a unique address, or any other value that uniquely identifies object 35 and a path to access object 35.

System 10 serializes the original container 45 that comprises the original reference 50. Application 1, 25, passes the serialized version of the original container 45 to application 2, 30. The deserialization module 20 on application 2, 30, deserializes the serialized version of the original container, instantiating a container clone 55. The container clone 55 comprises a reference clone 60. The reference clone 60 is equivalent to the original reference 50, providing access to object 35 by application 2, 30. Application 2, 30, uses the reference clone 60 to access or manipulate object 35. System 10 allows application 2, 30, to "pull" object 35 instead of requiring application 1, 25, to "push" object 35.

Figure 2:
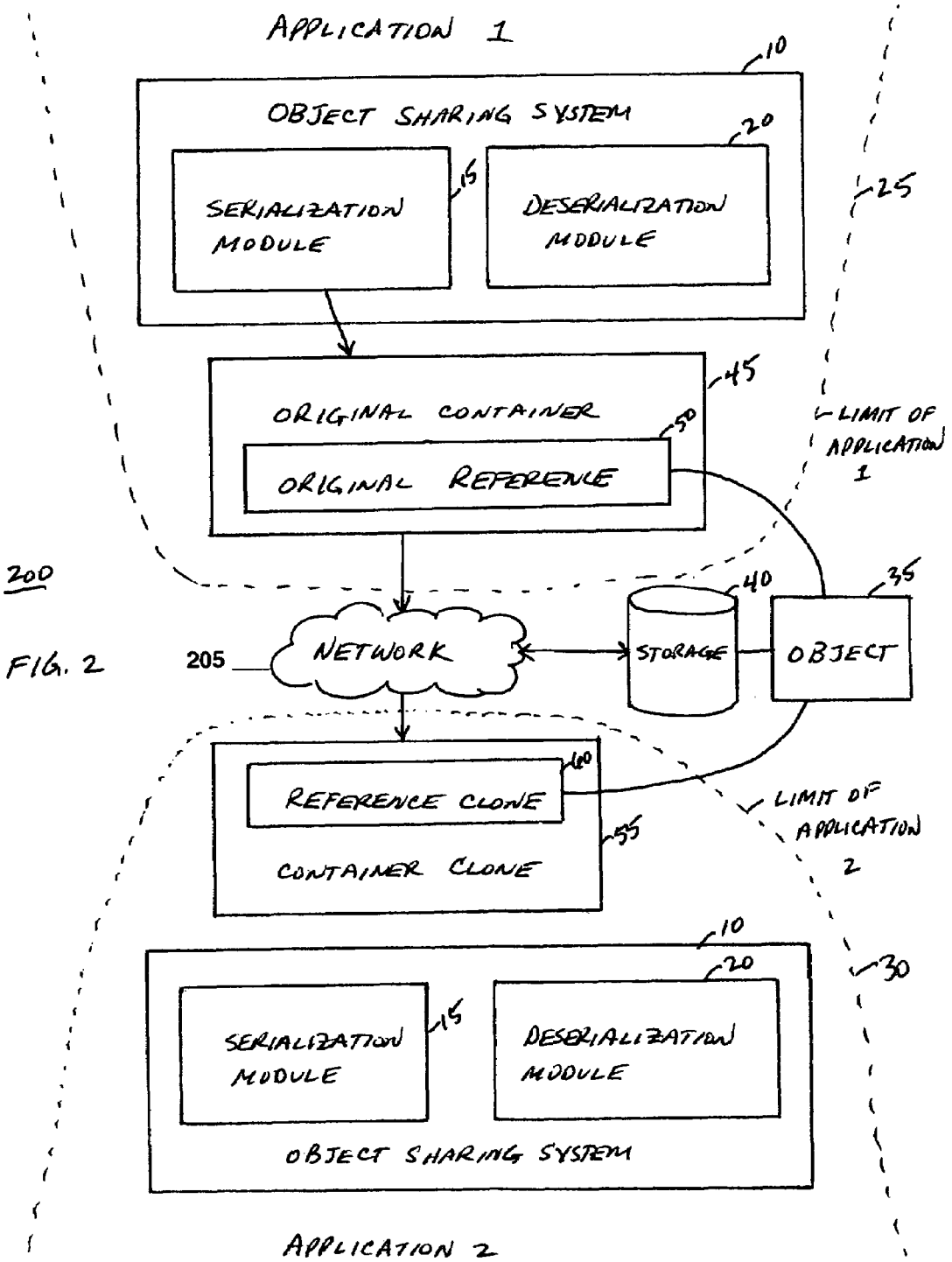
FIG. 2 is a schematic illustration of an exemplary operating environment in which an object sharing system of the present invention can be used in a networked environment.

FIG. 2 illustrates one embodiment in which application 1, 25, and application 2, 30, are part of a distributed network 200, communicating by means of a network 205. Object 35 on storage 40 is further accessed through a network 205 (as shown in FIG. 2) or locally by application 1, 25.

FIG. 3 illustrates a method 300 of operation of system 10. Application 1, 25, selects an object such as object 35 to be transferred (step 305). System 10 instantiates the original container 45 (step 310). The original container 45 comprises a reference to object 35, via original reference 50.

The serialization module 15 on application 1, 25, serializes the original container 45 (step 315). The serialization process of step 315 converts the original container 45 to a sequence of bytes. This sequence of bytes can be transferred to application 2, 30, via, for example, an inter-process communication (IPC) or the network 205. Application 1, 25, transfers the serialized original container 45 to application 2, 30 (step 320).

The deserialization module 20 on application 2, 30, deserializes the serialized original container 45 to instantiate the container clone 55 (step 325). The container clone 55 comprises the reference clone 60. The reference clone 60 is equivalent to the original reference 50. Application 2 utilizes the reference clone 60 to access object 35 (step 330).

In one embodiment, the serialization module 15 on application 1, 25, encrypts the serialized original container in step 315. Application 1, 25, then transfers an encrypted serialized original container 45 to application 2, 30. The deserialization module 20 on application 2, 30, decrypts the encrypted serialized original container 45 to obtain the serialized original container. The deserialization module 20 then deserializes the serialized original container 45 in step 325.

For example, a trusted Java virtual machine comprises class variables that are shared by instances of that class. Consequently, the original container 45 and the container clone 55 comprise a reference to the class variables. The trusted Java virtual machine can use system 10 to pass information between the classes.

An exemplary pseudocode for system 10 is as follows:

```
package com.ibm.trusted;
import java.io.IOException;
import java.io.ObjectInputStream;
import java.io.ObjectOutputStream;
import java.io.Serializable;
import java.util.Hashtable;
/**
 * This class allows for passing an object (rather than a clone) using
 * a TrustedDictionary while still maintaining a consistent reference
 * to the object.
 */
public class ObjectContainer
       implements Serializable
{
       // classStore is the Class variable which is the storage for all
       // objects referenced by ObjectContainer instances.
       transient private static Hashtable classStore;
       // classTime is the System.currentTimeMillis( ) when the Class
       // Object was created. This is saved by each ObjectContainer
       // instance as an extra check that they are associated with the
       // correct classStore instance.
       transient private static long classTime;
       // hashKey is the key used to retrieve the object from classStore
       private String hashKey;
       // instanceTime is used to verify that we will be retrieving the
       // value from the correct classStore - "prevents" using an
       // instance which has been restored to a different execution
       // context (e.g., after being read from a file).
       private long instanceTime;
       static {
            classStore = new Hashtable( );
            classTime = System.currentTimeMillis( );
       }
       /**
        * Create a container that may be used to pass an object
```

```
        * reference within a TrustedDictionary.
        * @param object - Object to be passed by reference.
        */
       public ObjectContainer(Object object) {
            instanceTime = classTime;
            while (true) {
                hashKey = Long.toString(System.currentTimeMillis( ));
                synchronized (classStore) {
                     Object currentValue = classStore.get(hashKey);
                     if (currentValue == null) {
                         classStore.put(hashKey,object);
                         break;
                     }
                }
            }
       }
       /**
        * Return the original Object passed as a parameter to the
        * Constructor
        * @return object passed as parameter to Constructor
        */
       public Object get( ) {
            if (instanceTime != classTime) {
                throw new IllegalStateException("get( ) requested " +
                     "from different execution environment than " +
                     "original instantiation");
            }
            synchronized (this) {
                if (hashKey == null) {
                     throw new IllegalStateException("get( ) " +
                         "requested from removed object");
                }
                return classStore.get(hashKey);
            }
       }
       /**
        * Override equals( ) in class Object. This is implemented so
        * that the clone of an ObjectContainer will equals( ) the
        * original.
        */
       public boolean equals(Object object) {
            if (instanceTime != classTime) {
                throw new IllegalStateException("equals( ) requested " +
                     "from different execution environment than " +
                     "original instantiation");
            }
            if (hashKey == null) {
                throw new IllegalStateException("equals( ) requested " +
                     "from removed object");
            }
            if (object == null) return false;
            if (this == object) return true;
            if (object instanceof ObjectContainer) {
                return
                     ((ObjectContainer)object).equals(hashKey,instanceTime);
            }
            return false;
       }
       /**
        * Override hashCode( ) in class Object. Required to agree with
        * the modified equals( ). The Java language specification
        * requires that if obj1.equals(obj2) returns true, then
        * obj1.hashCode( ) == obj2.hashCode( ).
        */
       public int hashCode( ) {
            if (instanceTime != classTime) {
                throw new IllegalStateException("hashCode( ) requested " +
                     "from different execution environment than " +
                     "original instantiation");
            }
            synchronized (this) {
                if (hashKey == null) {
                     throw new IllegalStateException("hashCode( ) " +
                         "requested from removed object");
                }
                return hashKey.hashCode( );
            }
       }
}
/**
```

```
                                  -continued

* This method may be called by a user to remove the referenced
* object from the classStore, if this has not been previously
* done.
*/
public void remove( ) {
    if (instanceTime != classTime) {
        throw new IllegalStateException("remove( ) requested " +
            "from different execution environment than " +
            "original instantiation");
    }
    synchronized (this) {
        if (hashKey == null) return;
        classStore.remove(hashKey);
        hashKey = null;
    }
}
/*
* "Private" method used to implement the equals(Object)
* method.
*/
private boolean equals(String string, long time) {
    if (instanceTime != classTime) {
        throw new IllegalStateException("equals( ) requested " +
            "from different execution environment than " +
            "original instantiation");
    }
    synchronized (this) {
        if (hashKey == null) {
            throw new IllegalStateException("equals( ) " +
                "requested from removed object");
        }
        return ((instanceTime==time) && hashKey.equals(string));
    }
}
/**
* Called by the garbage collector when there are no more
* references to this instance. The referenced object is
* removed from classStore, if this has not been previously
* done using the remove( ) method.
*/
protected void finalize( ) throws Throwable {
    // Check that we are associated with the right classStore
    if (instanceTime == classTime) {
        // We do not need to synchronize on this object since
        // there are no user references left (or we would not
        // have been called by the garbage collector).
        if (hashKey == null) return;
        classStore.remove(hashKey);
        hashKey = null;
    }
}
/*
* Implements the Serializable interface.
*/
private void readObject(ObjectInputStream in)
        throws IOException, ClassNotFoundException {
    instanceTime = in.readLong( );
    hashKey = in.readUTF( );
    if (instanceTime != classTime) {
        throw new ClassNotFoundException("Serialized " +
            "ObjectContainer restored to a different execution " +
            "environment than original instantiation");
    }
}
/*
* Implements the Serializable interface.
*/
private void writeObject(ObjectOutputStream out)
        throws IOException {
    out.writeLong(instanceTime);
    out.writeUTF(hashKey);
}
}
```

It is to be understood that the specific embodiments of the invention that have been described are merely illustrative of certain applications of the principle of the present invention. Numerous modifications may be made to the system and method for sharing an object between applications described herein without departing from the spirit and scope of the present invention. Moreover, while the present invention is described for illustration purpose only in relation to a virtual machine, it should be clear that the invention is applicable as well to, for example, any processing environment. Moreover, while the present invention is described in terms of Java, it should be clear that the invention is applicable as well to, for example, with any processing language. Furthermore, while the present invention is described for illustration purpose only in relation to a single processor environment, it should be clear that the invention is applicable as well to, for example, a distributed processor environment that communicates by means, for example, of a network.

What is claimed is:

1. A method of sharing an object between a plurality of applications in a single virtual processing environment, comprising:

selecting an object to be shared;

executing a first application and a second application in a virtual machine in memory on a computer processor;

instantiating a container that contains an original reference to an object of the first application in the virtual machine;

associating, with said container, a parameter responsive to an instantiation time of said container;

storing a hash key associated with said container;

creating a trusted dictionary to pass the object between the plurality of applications while maintaining a reference to the object;

determining if the object can be serialized;

serializing the container;

transferring the serialized container to the second application within the same virtual machine;

instantiating a container clone; said container clone, comprising a reference clone, wherein said reference clone is used by the second application to access or manipulate said object;

deserializing the transferred serialized container by the second application with a deserialization module; and extracting the reference clone from the deserialized container;

retrieving the object using the hash key associated with said container;

verifying that the object will be retrieved from a correct class storage area;

wherein the extracted reference clone allows the first application to share the object with the second application, by comparing and matching a parameter responsive to an instantiation time of the extracted reference clone and a parameter responsive to an instantiation time of the original reference and by comparing and matching a hash key associated with the extracted reference clone and the hash key associated with said container;

and wherein the extracted reference clone shares at least one variable in common with the original reference using a reference to a class variable;

removing the object from the class storage area when there are no more references to the object;

extending the method of sharing an object to all objects passed from one application to another application; and sharing the object with a plurality of applications.

2. The method according to claim 1, wherein serializing the container comprises creating a trusted dictionary, encrypting the container, and converting the original container to a sequence of bytes.

3. The method according to claim 1, wherein the object to be shared is not amenable to serialization.

4. The method according to claim 1, wherein deserializing the container comprises decrypting the container.

5. The method according to claim 1, wherein deserializing the container comprises cloning the container.

* * * * *